United States Patent
Lee et al.

(10) Patent No.: US 7,549,193 B2
(45) Date of Patent: Jun. 23, 2009

(54) STRUCTURE OF HINGE

(75) Inventors: Yung-Ta Lee, Sinjhuang (TW); Chao-Jui Lee, Sinjhuang (TW)

(73) Assignee: Jarllytec Co., Ltd., Taipei (TW)

( * ) Notice: Subject to any disclaimer, the term of this patent is extended or adjusted under 35 U.S.C. 154(b) by 519 days.

(21) Appl. No.: 11/507,894

(22) Filed: Aug. 22, 2006

(65) Prior Publication Data

US 2007/0119026 A1 May 31, 2007

(30) Foreign Application Priority Data

Nov. 25, 2005 (TW) .............................. 94220450 U

(51) Int. Cl.
*E05D 11/08* (2006.01)
*E05C 17/64* (2006.01)
(52) U.S. Cl. ....................................................... 16/342
(58) Field of Classification Search ........... 16/337–339, 16/342, 330, 303, 374, 376, 377, 340; 361/680–683, 361/814; 455/90.3, 575.1, 575.3, 575.8; 379/433.12, 433.13; 348/373, 333.01, 333.06, 348/794
See application file for complete search history.

(56) References Cited

U.S. PATENT DOCUMENTS

| | | | | |
|---|---|---|---|---|
| 5,333,356 A * | 8/1994 | Katagiri | | 16/340 |
| 6,085,388 A * | 7/2000 | Kaneko | | 16/338 |
| 6,256,838 B1 * | 7/2001 | Lu | | 16/342 |
| 6,297,946 B2 * | 10/2001 | O'Neal et al. | | 361/679.27 |
| 6,317,927 B1 * | 11/2001 | Lai et al. | | 16/342 |
| 7,500,288 B2 * | 3/2009 | Chung et al. | | 16/342 |
| 2002/0042971 A1 * | 4/2002 | Liao | | 16/342 |
| 2002/0112319 A1 * | 8/2002 | Kida | | 16/342 |
| 2003/0042109 A1 * | 3/2003 | Bacon | | 192/223 |
| 2005/0034274 A1 * | 2/2005 | Wu | | 16/342 |
| 2006/0236504 A1 * | 10/2006 | Lu et al. | | 16/342 |
| 2006/0272129 A1 * | 12/2006 | Rude et al. | | 16/342 |
| 2008/0151477 A1 * | 6/2008 | Chern | | 361/681 |

* cited by examiner

*Primary Examiner*—Chuck Y. Mah
(74) *Attorney, Agent, or Firm*—Guice Patents PLLC

(57) ABSTRACT

A hinge includes a pivot shaft affixed to a first member, a barrel affixed to a second member, a polygonal retaining split tube mounted in the barrel around the shaft body of the pivot shaft and hooked on an annular locating groove at the shaft body of the pivot shaft and forced by the inside wall of the barrel in friction engagement with the periphery of the shaft body of the pivot shaft.

7 Claims, 3 Drawing Sheets

A-A

STRUCTURE OF HINGE

BACKGROUND OF THE INVENTION

1. Field of the Invention

The present invention relates to hinges and more particularly, to a hinge, which uses a split retaining tube in a barrel to secure a pivot shaft, for allowing the pivot shaft to be rotated relative to the barrel and quickly positioned in the desired angle.

2. Description of the Related Art

A consumer electronic product with a lifting cover such as mobile computer, electronic dictionary, mobile video player, cell phone, etc., commonly uses a hinge to coupled the cover to the base member so that the cover can be opened from or closed on the base member. Therefore, the hinge also determines the quality level of the product. A good hinge allows positive positioning and does not cause noises during operation.

There is known a socket type hinge, which enables the pivot shaft to be positively positioned in the adjusted angular position. According to this design, the hinge comprises a female hinge member, which defines therein an axle hole, a male hinge member, which has a split shaft body positioned in the axle hole. The split shaft body of the male hinge member has two friction portions disposed in friction engagement with the peripheral wall of the axle hole of the female hinge member. However, this design of socket type hinge is not durable in use because the friction portions wear quickly with use.

Taiwan patent publication no. 313274, issued to the present inventor, discloses an improved structure of hinge for computer. According to this design, a springy adapter is provided between the male hinge member and the female hinge member to impart a friction resistance to the male hinge member, holding the male hinge member positively in the adjusted position. According to this design, the female hinge member must be processed to provide an inside annular step for securing the male hinge member in place. The processing of such an inside annular step is complicated, increasing the manufacturing time of the hinge.

SUMMARY OF THE INVENTION

The present invention has been accomplished under the circumstances in view. According to one aspect of the present invention, the hinge comprises a pivot shaft, a retaining split tube, and a barrel. The pivot shaft has a mounting portion for mounting, a shaft body, and a collar connected between the mounting portion and the shaft body. The shaft body has at least one annular locating groove extending around the periphery thereof. The barrel is capped on the shaft body of the pivot shaft and stopped against the collar of the pivot shaft, having an inside wall, a receiving open chamber surrounded by the inside wall for receiving the shaft body of the pivot shaft, and a mounting portion extended from one end thereof for mounting. The resilient retaining split tube is mounted in the receiving open chamber around the shaft body of the pivot shaft and forced by the inside wall of the barrel into friction with the periphery of the shaft body of the pivot shaft. The resilient retaining split tube has a plurality of angles respectively disposed in contact with the inside wall of the barrel, a plurality of planes respectively separated by the angles and disposed in contact with the periphery of the shaft body of the pivot shaft, a longitudinal crevice defined between two adjacent planes, and at least one retaining strip respectively protruded from the planes and engaged with the at least one annular locating groove of the shaft body of the pivot shaft to secure the pivot shaft to the retaining split tube and the barrel.

According to another aspect of the present invention, the mounting portion of the pivot shaft and the mounting portion of the barrel each have at least one mounting hole for mounting.

According to still another aspect of the present invention, the mounting portion of the pivot shaft and the mounting portion of the barrel each have at least one longitudinally extending plane.

According to still another aspect of the present invention, the number of the at least one annular locating groove of the pivot shaft is 1; the number of the at least one retaining strip of the split retaining tube is 2, and the two retaining strips are disposed at two sides relative to the longitudinal crevice and respectively engaged into the annular locating groove of the pivot shaft.

According to still another aspect of the present invention, the shaft body of the pivot shaft has a spiral grease groove extending around the periphery thereof for accommodating lubricating grease, and a chamfered end edge at the distal end remote from the collar.

According to still another aspect of the present invention, the split retaining tube has a relatively higher hardness than the barrel.

DETAILED DESCRIPTION OF THE PREFERRED EMBODIMENT

Figure 1:
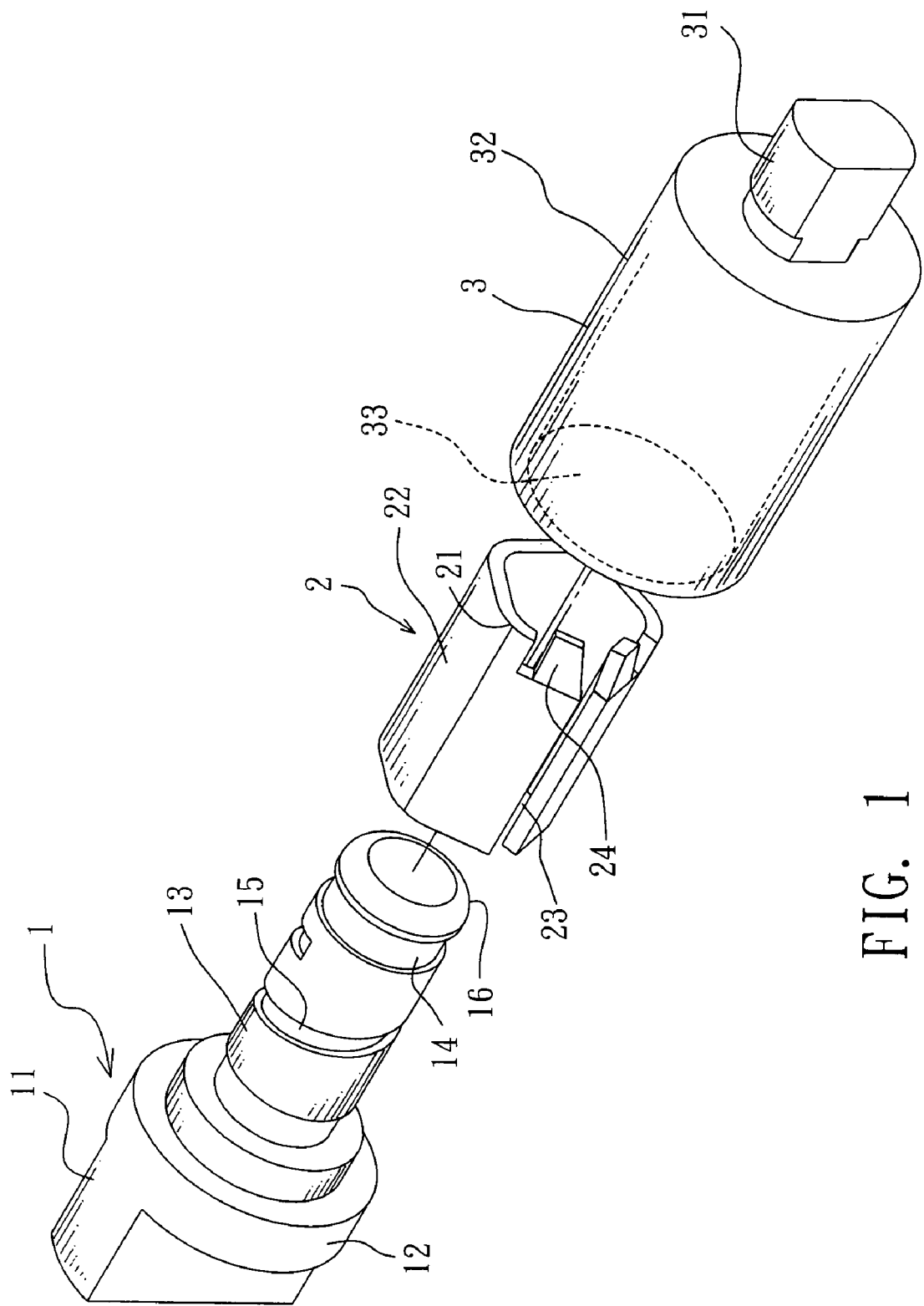
FIG. 1 is an exploded view of a hinge according to the present invention.
Figure 2:
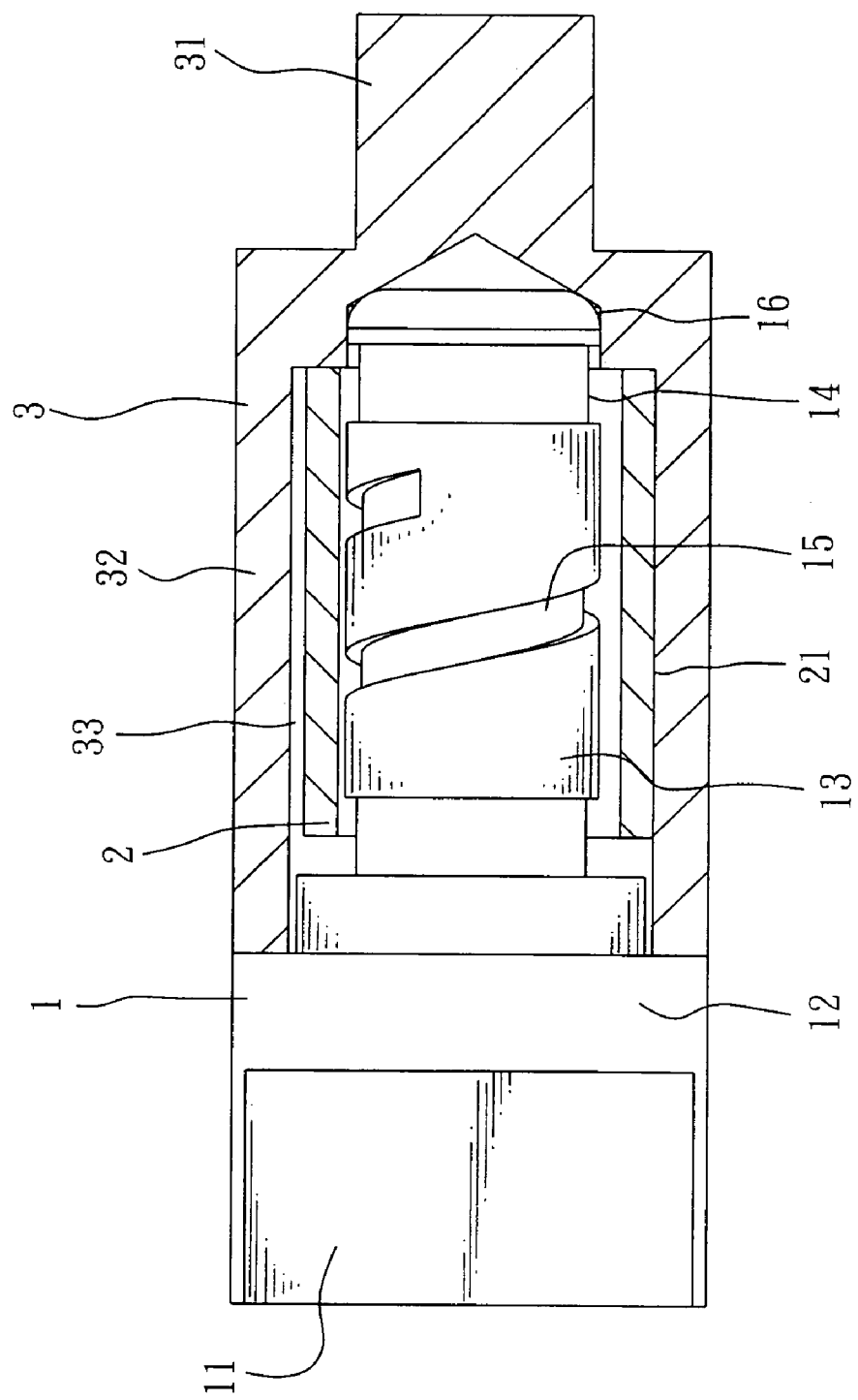
FIG. 2 is a sectional assembly view of the hinge according to the present invention.
Figure 3:
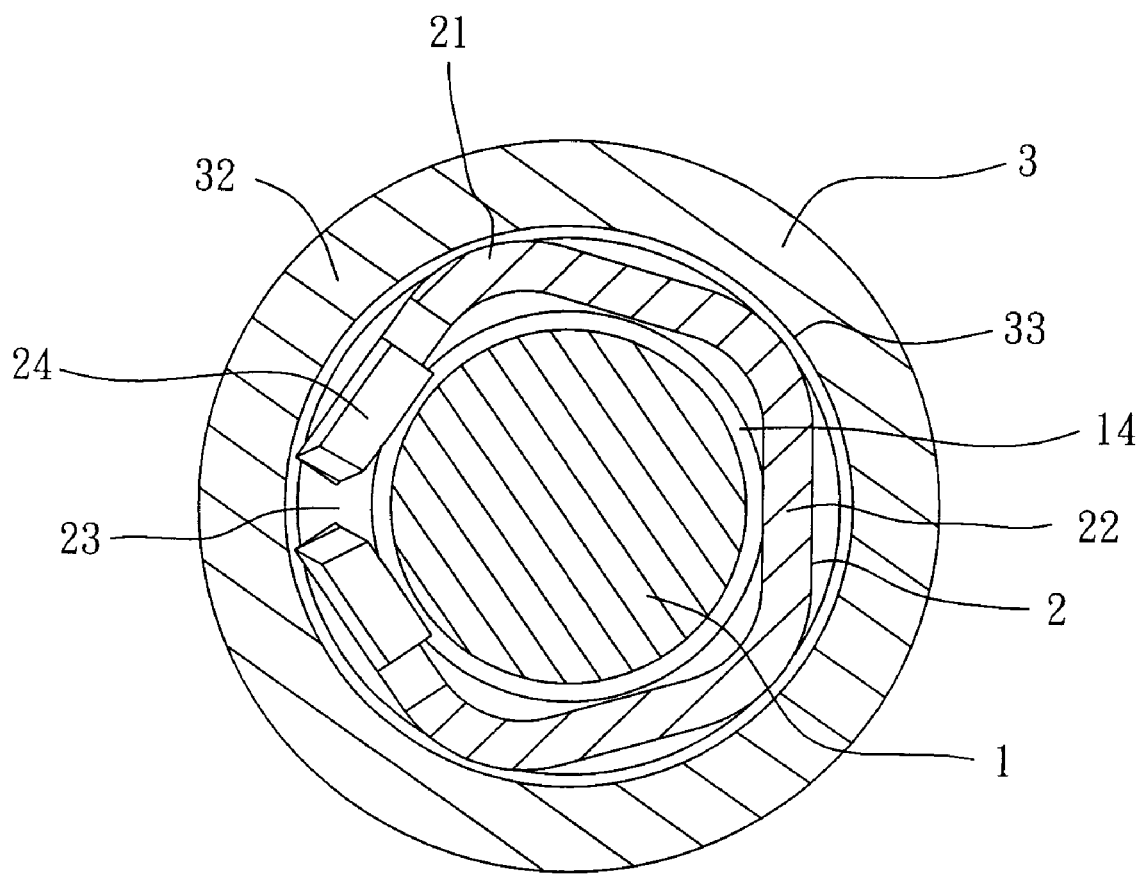
FIG. 3 is a cross-sectional view taken along line A-A of FIG. 2.

Referring to FIGS. 1~3, a hinge in accordance with the present invention is shown comprised of a pivot shaft 1, a retaining split tube 2, and a barrel 3.

The pivot shaft 1 has a mounting portion 11 disposed at one side for fastening to a body, for example, the cover member of a mobile electronic device, a shaft body 13 disposed at the other side for coupling to the retaining split tube 2, a collar 12 connected between the mounting portion 11 and the shaft body 13 for stopping against the barrel 3. The mounting portion 11 can be made in the shape of a flat bar, triangular prism, rectangular bar, or polygonal bar. Further, the mounting portion 11 can be made having mounting through holes for fastening to the cover member of a mobile electronic device with fastening members, for example, screws. The shaft body 13 has a chamfered front end 16 convenient for insertion into the retaining split tube 2, an annular locating groove 14 extending around the periphery adjacent to the chamfered front end 16, and a spiral grease groove 15 for receiving lubricating grease.

The retaining split tube 2 is a polygonal, for example, pentagonal split tube made of a metal spring plate, having a plurality of angles 21 and planes 22 alternatively arranged around the periphery, a longitudinal crevice 23 defined between two adjacent planes 22 and extending through two distal ends, and two retaining strips 24 respectively protruded from the two planes 22 at two sides of the longitudinal crevice 23 for engaging the annular locating groove 14 of the shaft body 13 of the pivot shaft 1 to secure the pivot shaft b1b to the inside of the retaining split tube 2.

The barrel 3 has a barrel body 32, a receiving open chamber 33 defined in the barrel body 32 and extending to one end of the barrel body 32 in communication with the atmosphere, and a mounting portion 31 extended from the other end of the barrel body 32 for fastening to, for example, the base member of the aforesaid mobile electronic device. The mounting portion 31 of the barrel 3 can be made in the shape of a flat bar, triangular prism, rectangular bar, or polygonal bar. Further, the mounting portion 31 can be made having mounting through holes for fastening to the base member of the mobile electronic device with fastening member, for example, screws. Further, the hardness of the retaining split tube 2 is relatively higher than the barrel 3.

During installation, the retaining split tube 2 is attached to the shaft body 13 of the pivot shaft 1 to force the locating groove 14 of the pivot shaft 13 into engagement with the two retaining strips 24 of the retaining split tube 2. Thereafter, the retaining split tube 2 is inserted with the pivot shaft 1 into the receiving open chamber 33 of the barrel 3. At this time, the inside wall of the barrel 3 compresses the retaining split tube 2 radially inwards (because the diameter of the retaining split tube 2 is slightly greater than the inner diameter of the barrel body 32 of the barrel 3, thereby keeping the retaining strips 24 in engagement with the annular locating groove 14 of the shaft body 13 of the pivot shaft 1. When rotating the pivot shaft 1, the inside wall of the barrel body 32 imparts a pressure to the angles 21 of the retaining split tube 2, forcing the planes 22 in friction with the periphery of the shaft body 13 of the pivot shaft 1. Therefore, the pivot shaft 1 is quickly positioned in position after disappearance of the external biasing force.

As indicated above, the invention provides a hinge, which is comprised of a pivot shaft, a retaining split tube, and a barrel. The retaining split tube is radially inwardly forced by the inside wall of the barrel against the periphery of the shaft body of the pivot shaft, thereby producing a friction resistance to hold the pivot shaft in position. Further, the split retaining tube has retaining strips engaged with the annular locating groove of the pivot shaft, preventing disconnection of the pivot shaft from the barrel. Further, the pivot shaft has a spiral grease groove spirally extending around the periphery of the shaft body of the pivot shaft for accommodating lubricating grease to lubricate the contact area between the pivot shaft and the split retaining tube.

Although a particular embodiment of the invention has been described in detail for purposes of illustration, various modifications and enhancements may be made without departing from the spirit and scope of the invention.

What is claimed is:

1. A hinge comprising:
   a pivot shaft, said pivot shaft having a mounting portion for mounting, a shaft body, and a collar connected between the mounting portion of said pivot shaft and said shaft body, said shaft body having at least one annular locating groove extending around the periphery thereof;
   a barrel capped on the shaft body of said pivot shaft and stopped against the collar of said pivot shaft, said barrel having an inside wall, a receiving open chamber surrounded by said inside wall for receiving the shaft body of said pivot shaft, and a mounting portion extended from one end thereof for mounting; and
   a resilient retaining split tube mounted in said receiving open chamber around the shaft body of said pivot shaft and forced by the inside wall of said barrel into friction with the periphery of the shaft body of said pivot shaft, said resilient retaining split tube having a plurality of angles respectively disposed in contact with the inside wall of said barrel, a plurality of planes respectively separated by said angles and disposed in contact with the periphery of the shaft body of said pivot shaft, a longitudinal crevice defined between two adjacent planes, and at least one retaining strip respectively protruded from said planes and engaged with the at least one annular locating groove of the shaft body of said pivot shaft to secure said pivot shaft to said retaining split tube and said barrel.

2. The hinge as claimed in claim 1, wherein the mounting portion of said pivot shaft and the mounting portion of said barrel each have at least one mounting hole for mounting.

3. The hinge as claimed in claim 1, wherein the mounting portion of said pivot shaft and the mounting portion of said barrel each have at least one longitudinally extending plane.

4. The hinge as claimed in claim 1, wherein the number of the at least one annular locating groove is one; the number of the at least one retaining strip of said split retaining tube is two, and the two retaining strips are disposed at two sides relative to said longitudinal crevice and respectively engaged into the annular locating groove of said pivot shaft.

5. The hinge as claimed in claim 1, wherein said shaft body of said pivot shaft has a spiral grease groove extending around the periphery thereof for accommodating a lubricating grease.

6. The hinge as claimed in claim 1, wherein the shaft body of said pivot shaft has a chamfered end edge at one end thereof remote from said collar.

7. The hinge as claimed in claim 1, wherein said split retaining tube has a relatively higher hardness than said barrel.

* * * * *